US012712288B2

(12) United States Patent
Lu

(10) Patent No.: US 12,712,288 B2
(45) Date of Patent: Aug. 18, 2026

(54) ELECTRONIC DEVICE

(71) Applicant: Advanced Semiconductor Engineering, Inc., Kaohsiung (TW)

(72) Inventor: Shih-Wen Lu, Kaohsiung (TW)

(73) Assignee: Advanced Semiconductor Engineering, Inc., Kaohsiung (TW)

(*) Notice: Subject to any disclaimer, the term of this patent is extended or adjusted under 35 U.S.C. 154(b) by 85 days.

(21) Appl. No.: 18/408,524

(22) Filed: Jan. 9, 2024

(65) Prior Publication Data

US 2024/0145941 A1 May 2, 2024

Related U.S. Application Data

(63) Continuation of application No. 17/407,066, filed on Aug. 19, 2021, now Pat. No. 11,870,152.

(51) Int. Cl.

| | |
|---|---|
| ***H01Q 21/29*** | (2006.01) |
| ***H01Q 1/22*** | (2006.01) |
| ***H01Q 3/22*** | (2006.01) |
| ***H01Q 13/18*** | (2006.01) |
| ***H01Q 21/00*** | (2006.01) |

(52) U.S. Cl.

CPC ........... *H01Q 21/29* (2013.01); *H01Q 1/2283* (2013.01); *H01Q 3/22* (2013.01); *H01Q 13/18* (2013.01); *H01Q 21/005* (2013.01)

(58) Field of Classification Search

CPC ........ H01Q 1/2283; H01Q 3/22; H01Q 13/18; H01Q 21/005; H01Q 21/29

See application file for complete search history.

(56) References Cited

U.S. PATENT DOCUMENTS

| | | | | |
|---|---|---|---|---|
| 2011/0309893 | A1* | 12/2011 | Kawamura | H01L 25/0657 257/E31.001 |
| 2014/0035097 | A1* | 2/2014 | Lin | H01L 23/66 257/E29.325 |
| 2016/0126637 | A1* | 5/2016 | Uemichi | H01Q 21/0043 343/771 |
| 2018/0342470 | A1 | 11/2018 | Liao et al. | |
| 2019/0115643 | A1* | 4/2019 | Khan | H01Q 9/42 |
| 2020/0067201 | A1* | 2/2020 | Rogers | H01P 5/107 |
| 2021/0044002 | A1 | 2/2021 | Lee et al. | |
| 2021/0210865 | A1* | 7/2021 | Li | H01Q 21/0043 |
| 2021/0305694 | A1 | 9/2021 | Kim et al. | |

OTHER PUBLICATIONS

Non-Final Office Action for U.S. Appl. No. 17/407,066, issued May 4, 2023, 14 pages.

Notice of Allowance for U.S. Appl. No. 17/407,066, issued Aug. 30, 2023, 10 pages.

* cited by examiner

*Primary Examiner* — Amal Patel

(74) *Attorney, Agent, or Firm* — Foley & Lardner LLP

(57) ABSTRACT

The present disclosure relates to an electronic device that includes a first radiating element configured to radiate a first electromagnetic wave and a second radiating element configured to radiate a second electromagnetic wave. A first radiation pattern of the first electromagnetic wave is configured to be adjusted, and a second radiation pattern of the second electromagnetic wave is configured to be fixed.

20 Claims, 6 Drawing Sheets

6

ELECTRONIC DEVICE

CROSS-REFERENCE TO RELATED APPLICATION

This application is a continuation of U.S. patent application Ser. No. 17/407,066 filed Aug. 19, 2021, now issued as U.S. Pat. No. 11,870,152, the content of which is incorporated herein by reference in its entirety.

BACKGROUND

1. Technical Field

The present disclosure generally relates to an electronic device used in wireless communications.

2. Description of the Related Art

Wireless transceiving systems in which user equipment (or a wireless communication device) communicates via wireless network to a network of base transceiver stations have undergone rapid development through a number of generations. As the data communication capacity of wireless transceiving systems increases, the need to optimize the coverage of the wireless transceiving systems also increases.

SUMMARY

In some arrangements, an electronic device includes a first radiating element configured to radiate a first electromagnetic wave and a second radiating element configured to radiate a second electromagnetic wave. A first radiation pattern of the first electromagnetic wave is configured to be adjusted, and a second radiation pattern of the second electromagnetic wave is configured to be fixed.

In some arrangements, an electronic device includes a first antenna element configured to receive a first electromagnetic wave, a processing unit configured to convert the first electromagnetic wave to a second electromagnetic wave, and a second antenna element configured to radiate the second electromagnetic wave.

In some arrangements, an electronic device includes a supporting element having a first surface and a second surface opposite to the first surface, a plurality of first antenna elements supported by the first surface of the supporting element and having a first scan-angle coverage, and a second antenna element supported by the second surface of the supporting element and having a second scan-angle coverage. The first scan-angle coverage is wider than the second scan-angle coverage.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
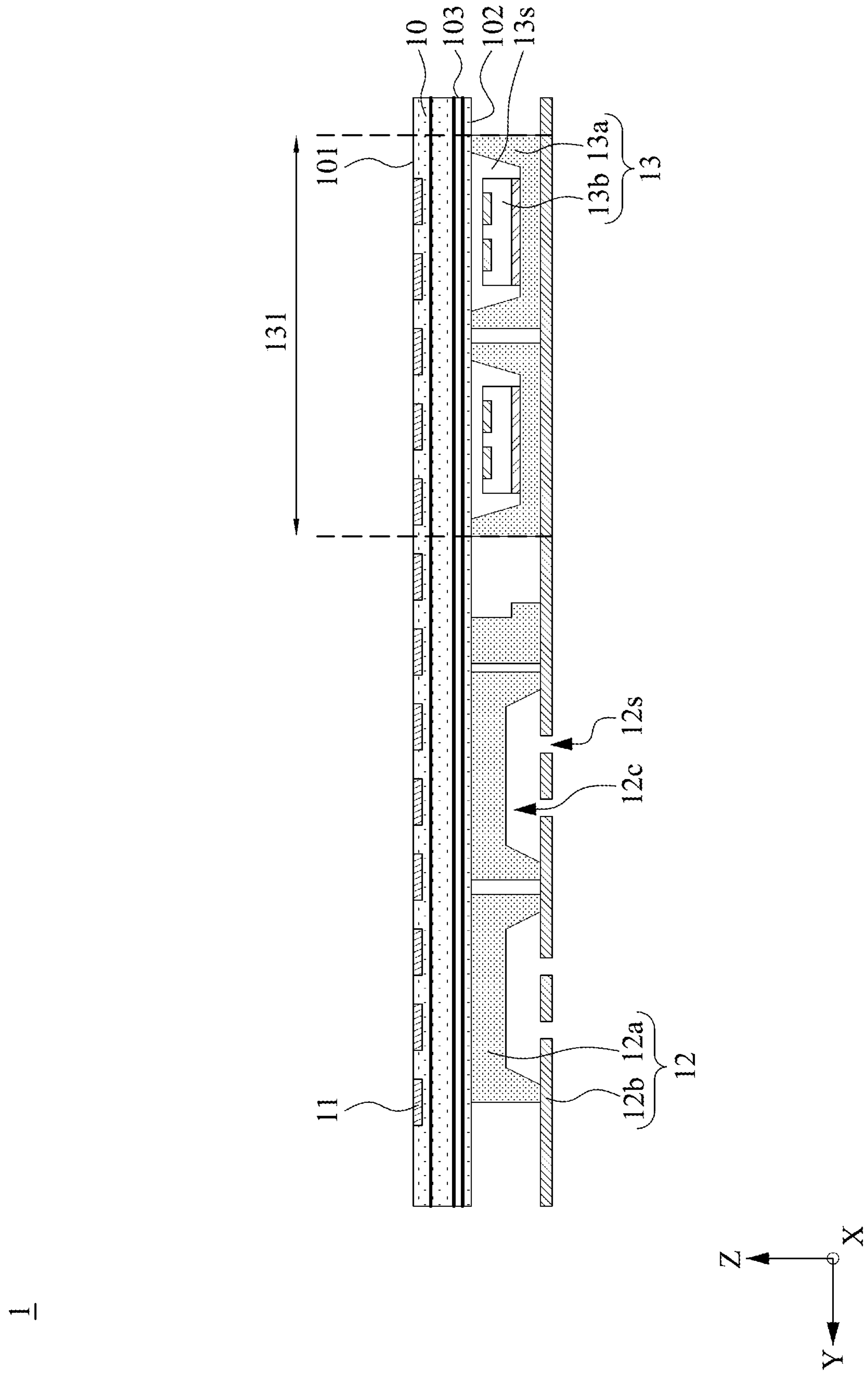
FIG. 1 illustrates a cross-sectional view of an electronic device in accordance with some arrangements of the present disclosure.

The following disclosure provides for many different arrangements, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include arrangements in which the first and second features are formed in direct contact, and may also include arrangements in which additional features may be formed between the first and second features, such that the first and second features may not be in direct contact. Besides, the present disclosure may repeat reference numerals and/or letters in the various examples. This repetition is for simplicity and clarity and does not in itself dictate a relationship between the various arrangements and/or configurations discussed.

Embodiments of the present disclosure are discussed in detail below. It should be appreciated, however, that the present disclosure provides many applicable concepts that can be embodied in a wide variety of specific contexts. The specific arrangements discussed are merely illustrative and do not limit the scope of the disclosure.

FIG. 1 illustrates a cross-sectional view of an electronic device 1 in accordance with some arrangements of the present disclosure. In some arrangements, the electronic device 1 may include a substrate 10, radiating elements 11 and 12, and a circuit region 13. In some arrangements, the electronic device 1 may include a semiconductor device or a semiconductor device package.

In some arrangements, the substrate 10 may be or function as a carrier. In some arrangements, the substrate 10 may include a supporting element configured to structurally support the substrate 10 and the rest of the electronic device 1. In some arrangements, the substrate 10 may include, for example, a printed circuit board (PCB) such as a paper-based copper foil laminate, a composite copper foil laminate, a polymer-impregnated glass-fiber-based copper foil laminate, or so on. In some arrangements, the substrate 10 may include other kinds of carrier. The substrate 10 may have a surface 101, a surface 102 opposite to the surface 101, and a surface 103 (also referred to as a lateral surface of the substrate 10) extending between the surface 101 and the surface 102. In some arrangements, the surface 103 may be angled or nonparallel with respect to the surface 101 and/or the surface 102. In some arrangements, the substrate 10 may include one or more of a redistribution layer (RDL), a grounding element, a feeding line, a conductive transmission line, or other conductive structures.

In some arrangements, the radiating elements 11 (and each individually, the radiating element 11) may be disposed on the surface 101 of the substrate 10. In some arrangements, the radiating element 11 may be structurally supported by the surface 101 of the substrate 10. In some arrangements, the radiating element 11 may be adjacent to the surface 101 of the substrate 10. In some arrangements, the radiating element 11 may be partially embedded in the supporting element (e.g., the substrate 10). For example, the element 11 may be partially exposed from the supporting element (e.g., from the surface 101 the substrate 10). In other arrangements, the radiating element 11 may be entirely embedded in the supporting element (e.g., the substrate 10), such that no portion of the radiating element 11 is exposed by the supporting element. In some arrangements, the radiating element 11 and the radiating element 12 may be disposed on opposite sides of the substrate 10 as shown. For example, the radiating elements 12 (and each individually, the radiating element 12) may be disposed on the surface 102 of the substrate 10. For example, the radiating element 12 may be structurally supported by the surface 102 of the substrate 10. In some arrangements, the radiating element 12 may be adjacent to the surface 102 of the substrate 10. In some arrangements, the radiating element 12 may be partially embedded in the supporting element (e.g., the substrate 10). For example, the element 12 may be partially exposed from the supporting element (e.g., from the surface 101 the substrate 10). In some arrangements, the radiating element 12 may be entirely embedded in the supporting element (e.g., the substrate 10), such that no portion of the radiating element 11 is exposed by the supporting element. In some arrangements, the radiating element 11 and the radiating element 12 may be disposed on the same side of the substrate 10. For example, the radiating element 11 and the radiating element 12 may be disposed side-by-side on the surface 101 or the surface 102, such that at least one radiating element 11 is adjacent to at least one radiating element 12 on the surface 101 or the surface 102. Furthermore, in some arrangements, the radiating element 12 may be disposed on the surface 103 or another lateral surface of the substrate 10. For example, the radiating element 11 and the radiating element 12 may be disposed side-by-side on the surface 103 or another lateral surface of the substrate 10, such that at least one radiating element 11 is adjacent to at least one radiating element 12 on the surface 103 or another lateral surface of the substrate 10.

In some arrangements, the radiating element 11 may include an antenna array or phased array antennas. For example, the radiating element 11 may include a patch antenna, a chip antenna, or other antenna elements. In some arrangements, the radiating element 11 may include a plurality of antenna elements. In some arrangements, the radiating element 11 may include a plurality of antenna elements arranged in an array.

In some arrangements, the radiating element 11 may be configured to receive, conduct, transmit, and/or radiate electromagnetic waves supporting a first network or network protocol. An example of the first network or network protocol includes a Wireless Local Area Network (WLAN), such as Wi-Fi or another wireless network that allows one or more user equipment (UE), such as the UE 20 illustrated in FIG. 2, to communicate with the electronic device 1 or a device including the electronic device 1.

In some arrangements, the radiating element 12 may include an antenna array or phased array antennas. For example, the radiating element 12 may include a patch antenna, a chip antenna, a slot antenna (such as a waveguide slot antenna or a slotted antenna), or other antenna elements. In some arrangements, the radiating element 12 may include a plurality of antenna elements. In some arrangements, the radiating element 12 may include a plurality of antenna elements arranged in an array. For example, the radiating element 12 may include a conductive structure 12*a* and a conductive layer 12*b*. The conductive structure 12*a* may be disposed between the conductive layer 12*b* and the substrate 10. The conductive structure 12*a* may define a hole or a cavity 12*c*, which is an empty volume. In some arrangements, electromagnetic waves may resonate in the cavity 12*c*. In some arrangements, the cavity 12*c* may be configured to conduct and/or transmit electromagnetic waves. In some arrangements, electromagnetic waves may travel through the space defined by the cavity 12*c* through a medium (such as air) therein. In some arrangements, the conductive structure 12*a* may include a waveguide or a lead frame that defines the cavity 12*c*. The conductive layer 12*b* may at least partially cover the cavity 12*c*. For example, the conductive layer 12*b* may have one or more slots 12*s* exposing the cavity 12*c*. In some arrangements, the slots 12*s* may be configured to receive and/or radiate electromagnetic waves. In some arrangements, including that shown in FIG. 1, the radiating element 12 and the radiating element 11 may include different antenna types. In other arrangements, the radiating element 12 may include the same antenna type as the radiating element 11.

In some arrangements, the radiating element 12 may be configured to receive, conduct, transmit, and/or radiate electromagnetic waves supporting a second network or network protocol. Examples of the second network or network protocol include 5th generation mobile (5G) networks, 4th generation mobile (4G) networks, Long Term Evolution (LTE) network, 3rd generation mobile (3G) networks, or another wireless network that allows the electronic device 1 to access the Internet by communicating with a base transceiver station (BTS), such as the BTS 21 illustrated in FIG. 2, or a satellite, such as the satellite 51 illustrated in FIG. 5. In some arrangements, the radiating element 11 and the radiating element 12 may be configured to radiate electromagnetic waves having different frequencies or bandwidths. In other words, the first and second networks or network protocols correspond to different frequencies or bandwidths. In other arrangements, the radiating element 11 and the radiating element 12 may be configured to radiate electromagnetic waves having a substantially same one or more frequencies and/or one or more bandwidths. In other words, the first and second networks or network protocols correspond to the same one or more frequencies and/or one or more bandwidths.

In some arrangements, the circuit region 13 may be disposed on the surface 102 of the substrate 10. In some arrangements, the circuit region 13 may be physically spaced apart from the radiating element 12, such that a gap exists between the circuit region 13 and the radiating element 12. In the example in which the radiating elements 11 and 12 are located on or adjacent to the same side (e.g., the surface 102), the circuit region 13 may be physically spaced apart from both the radiating elements 11 and 12. In some arrangements, the circuit region 13 may not overlap with the radiating element 12 in a direction substantially perpendicular to the surface 102 and/or the surface 101 of the substrate 10. In some arrangements, the circuit region 13 may at least partially overlap with the radiating element 11 in a direction substantially perpendicular with the surface 102 of the substrate 10.

In some arrangements, the circuit region 13 may include a device mounting region 131. In some arrangements, the circuit region 13 may include conductive structure 13*a* and an electronic component 13*b*. In some arrangements, the electronic component 13*b* may be electrically connected to the substrate 10 (e.g., to the conductive structures thereof) through the conductive structure 13*a*. In some arrangements, the electronic component 13*b* may be disposed within a space 13*s* defined by the conductive structure 13*a* to reduce the package size of the electronic device 1. For example, the electronic component 13*b* may be disposed on other available space to further reduce the package size of the electronic device 1. In some arrangements, the conductive structure 13*a* may include a frame made from a metal or metal alloy material (e.g., lead). The configurations in which the conductive structure 13*a* encloses the electronic component 13*b* can also serve to protect the electronic component 13*b* structurally. In some other arrangements, the electrical connection between the electronic component 13*b* and the substrate 10 may be attained by way of flip-chip, wire-bonding, or so on.

Figure 6:
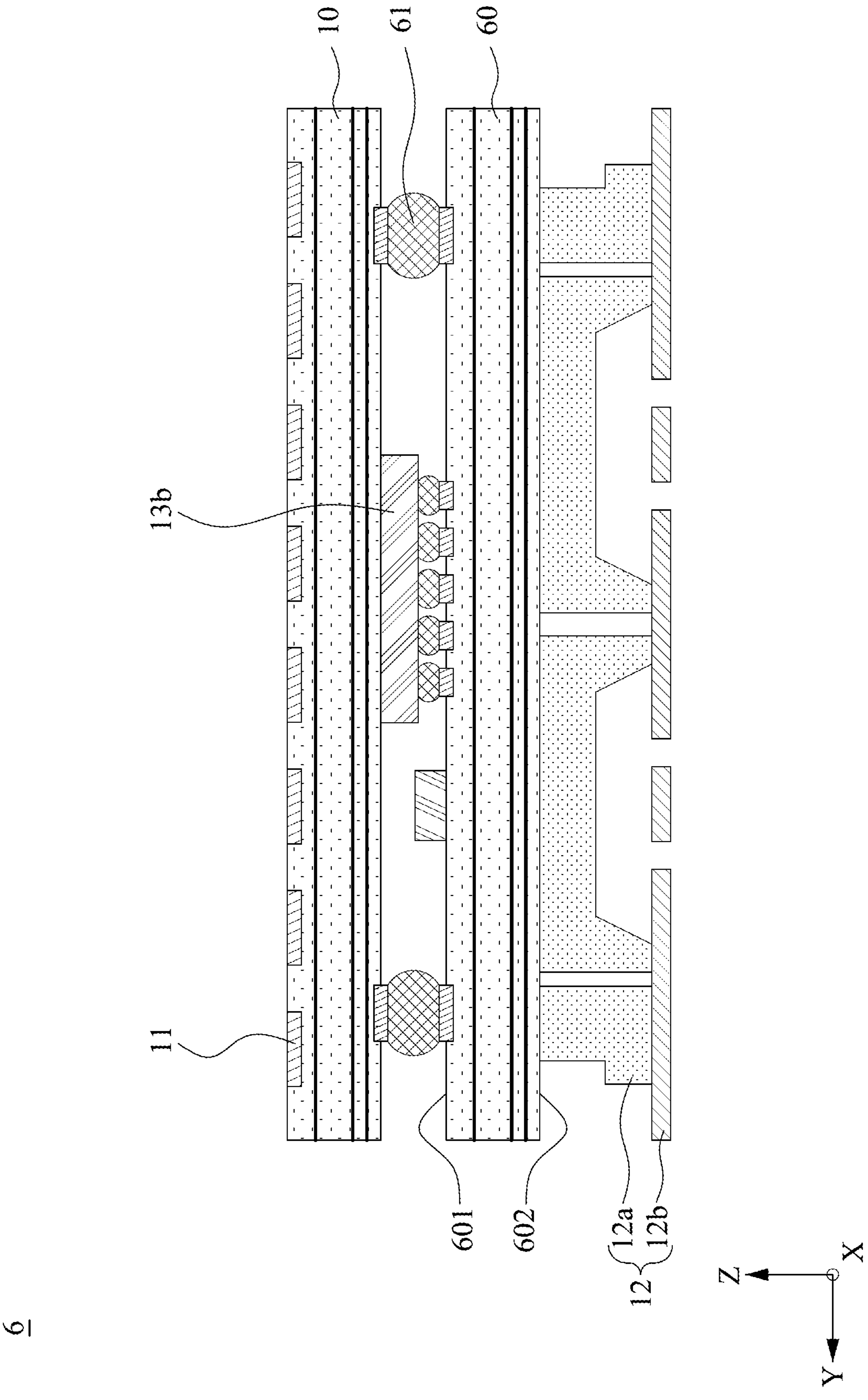
FIG. 6 illustrates a cross-sectional view of an electronic device in accordance with some arrangements of the present disclosure.

To enhance the antenna performance (such as to increase the antenna gain or to increase the antenna bandwidth) to meet the high-speed transmission requirements, the radiating element 11 may be arranged in an array in an xy-coordinate plane, which may increase the package size in the xy-coordinate plane. By overlapping the electronic component 13*b* with the radiating element 11 along a direction perpendicular to the xy-coordinate plane (e.g., the z direction), a smaller form factors of the package can be achieved. For example, the electronic component 13*b* may be disposed next to the radiating element 12 as shown in FIG. 1 or disposed between the radiating element 11 and the radiating element 12 as shown in FIG. 6. An imaginary line extending in z direction traverses the surfaces 101 and 102 in some examples.

In some arrangements, the electronic component 13*b* may be electrically connected the radiating element 11 through the substrate 10. For example, the electronic component 13*b* may be electrically connected the radiating element 11 through a conductive transmission line, such as a microstrip line in the substrate 10. In some arrangements, the electronic component 13*b* may be electrically connected the radiating element 12 through the substrate 10. For example, the electronic component 13*b* may be electrically connected the radiating element 12 through a conductive transmission line, such as a microstrip line in the substrate 10.

In some arrangements, the electronic component 13*b* may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some arrangements, the electronic component 13*b* may include a processing unit. In some arrangements, the electronic component 13*b* may include one or more of a radio frequency (RF) integrated circuit (IC), an analog-to-digital (A/D) converter, a digital-to-analog (D/A) converter, a filter, a low noise amplifier (LNA), a power amplifier, a multiplexer, a demultiplexer, a modulator, a demodulator, and so on.

In some arrangements, the electronic component 13*b* may be configured to convert an electromagnetic wave received from the radiating element 11 to another electromagnetic wave to be radiated by the radiating element 12, and vice versa. For example, the electronic component 13*b* may be configured to convert an electromagnetic wave supporting the first network or network protocol (e.g., the Wi-Fi network) to another electromagnetic wave supporting the second network or network protocol (e.g., 5G network), and vice versa. In some arrangements, the converting processes may include one or more of multiplexing/demultiplexing, modulation/demodulation, channel encoding/channel decoding, encryption/decryption, source encoding/source decoding, filtering, power amplifying, converting into digital format, converting into analog format, and so on. In some arrangements, the electromagnetic wave received from the radiating element 11 (or from the radiating element 12) may be converted by, for example, one or more of an LNA, a filter, a demodulator, an A/D converter, an RF IC, a D/A converter, a filter, a power amplifier, and then transmitted by the radiating element 12 (or by the radiating element 11).

For example, the electronic component 13*b* may include a transceiver (or a receiver, or a transmitter) connected with the radiating element 11 and the radiating element 12. The radiating element 11 and the radiating element 12 may transform the electrical signals into radio signals in the form of electromagnetic waves and vice versa. Therefore, the transceiver may receive and transmit electromagnetic wave via the radiating element 11 and the radiating element 12.

In an example reception path, the electronic component 13*b* (including one or more of a transceiver, a receiver, other processing units, and so on) may receive or collect the electrical signals from the radiating element 11 (or from the radiating element 12) and process the electrical signals using one or more of demultiplexing, demodulation, channel decoding, decryption, source decoding, filtering, amplifying, and converting into digital format.

In an example transmission path (or a radiation path), the electronic component 13*b* (including one or more of a transceiver, a transmitter, other processing units, and so on) may process the electrical signals using one or more of source encoding, encryption, channel encoding, modulation, multiplexing, filtering, amplifying, and converting into analog format. Then the electrical signals may be transformed to radio signals in the form of electromagnetic waves and transmitted by the radiating element 11 (or by the radiating element 12).

According to an arrangement of the present disclosure, the radiating element 11 may receive a first electromagnetic wave from a device (such as from a UE) and transforms the received first electromagnetic wave into electrical signals. The electronic component 13*b* may process the electrical signals through a reception path as described herein. Then, the electronic component 13*b* may process the electrical signals through a transmission path as described herein. The radiating element 12 may transform the electrical signals into a second electromagnetic wave to be sent to another device (such as a BTS).

Although there are two electronic components 13 in FIG. 1, the number of the electronic components is not limited thereto. In some arrangements, there may be any number of electronic components in the electronic device 1 depending on design requirements.

In some arrangements, the electronic device 1 may include a beam-forming processor (not shown) connected with the radiating element 11 and/or the radiating element 12. The beam-forming processor may adjust the amplitude and/or phase of the electromagnetic waves and change the directionality of the radiation patterns thereof. In some arrangements, the spectral efficiency of the radiating element 11 and/or the radiating element 12 may be improved through the beam forming process. In some arrangements, the beam-forming process may be performed in either the analog or digital domain. The beam-forming processor may include, for example, one or more of an analog phase shifter, a digital phase shifter, a vector modulator, an A/D converter, an amplifier, and so on. In some arrangements, the beam-forming processor may be integrated with or included in the circuit region 13.

In some arrangements, the components in the electronic device 1 (such as the substrate 10, the radiating elements 11 and 12, and the circuit region 13) may be integrated into a package. For example, the electronic device 1 may include a package body encapsulating the components in the electronic device 1. In some arrangements, the package body includes an epoxy resin having fillers, a molding compound (e.g., an epoxy molding compound or other molding compound), a polyimide, a phenolic compound or material, a material with a silicone dispersed therein, or a combination thereof. In some arrangements, the radiating element 11 and/or the radiating element 12 may be at least partially exposed from the package body.

Figure 2:
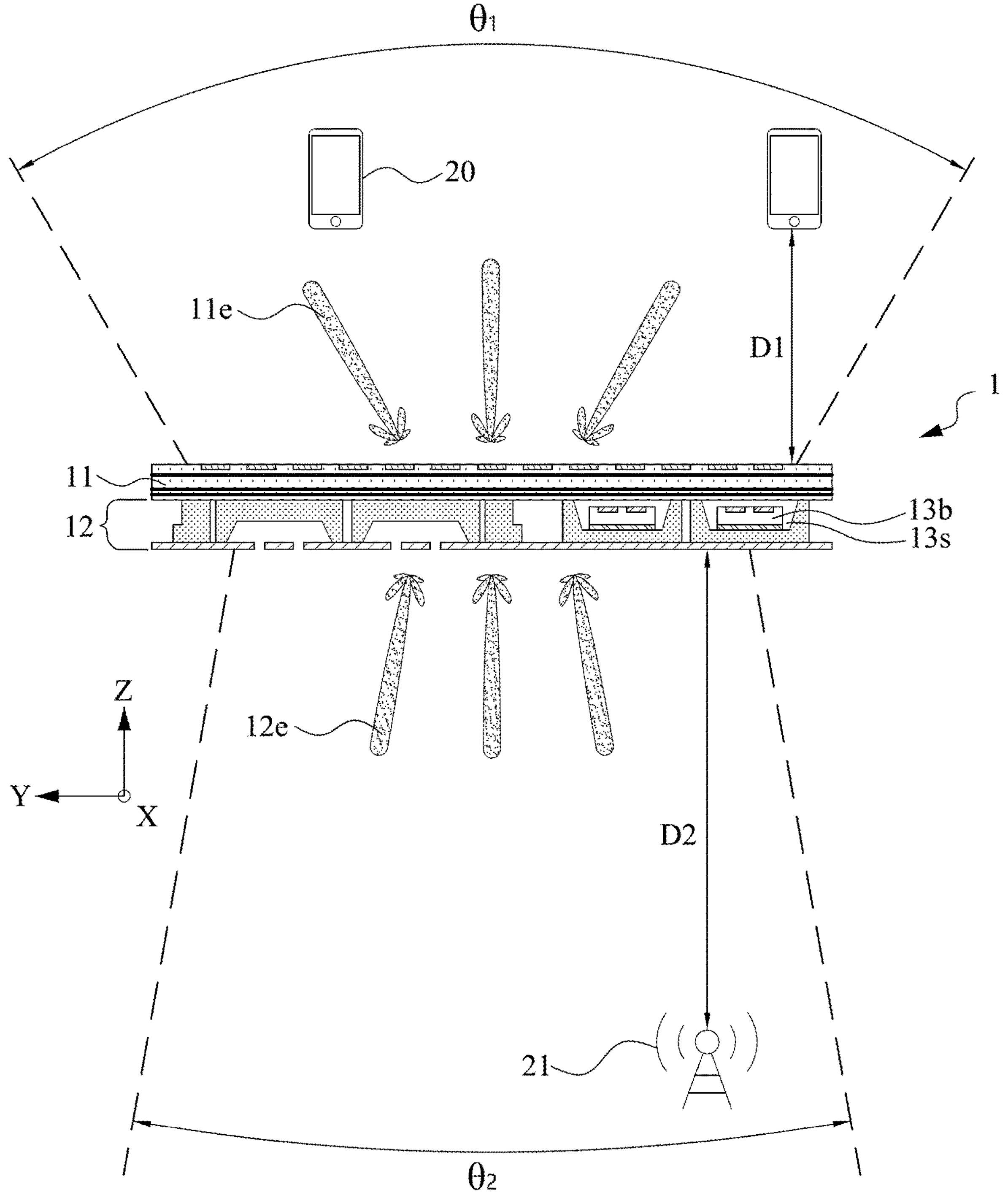
FIG. 2 illustrates a schematic diagram showing a wireless transceiving system in accordance with some arrangements of the present disclosure.

FIG. 2 illustrates a schematic diagram showing a wireless transceiving system in accordance with some arrangements of the present disclosure. The electronic device 1 in FIG. 1 may be used in the wireless transceiving system in FIG. 2. For example, a device including the electronic device 1 can be used to facilitate communication between the UE 20 and the BTS 21. As shown, the UE 20 may be in communication with the BTS 21 through the electronic device 1.

In some arrangements, the UE 20 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some arrangements, the UE 20 may include a movable or mobile device. In some arrangements, the UE 20 may include a portable device. According to an arrangement of the present disclosure, the UE 20 may include a portable wireless communication device, a smart phone, a cellular telephone, a flip phone, a device having a subscriber identity module, a personal computer, a selective call receiver, or any other device that is capable of sending and receiving communication signals on a wireless network. In some arrangements, the UE 20 may include wearable devices, such as smart watches, fitness bands, optical head-mounted displays, or the like. Moreover, the UE 20 may be referred to as a subscriber unit, a mobile, a mobile station, a user, a terminal, a mobile terminal, a wireless terminal, a fixed terminal, a subscriber station, a user terminal, a wireless communication device, or a device, or described using other terminology used in the art.

In some arrangements, the BTS 21 may also be referred to as a base station, an access point, an access terminal, a base, a macro cell, a node-B, an enhanced node B (eNB), a gNB, a home node-B, a relay node, or a device, or described using other terminology used in the art. The BTS 21 may be generally part of a radio access network that may include a controller and is connected to a core network. The BTS 21 may be configured to transmit and/or receive wireless signals (such as the electromagnetic waves) with UEs within a particular geographic region, which may be referred to as a cell (not shown in FIG. 2). It should be understood that the term "base transceiver station" may refer to a single physical transmission-reception point (TRP) or to multiple physical TRPs that may or may not be co-located. In some arrangements, the mobility of the BTS 21 may be lower than the mobility of the UE 20.

The radiating element 11 may be configured to receive, conduct, transmit, and/or radiate electromagnetic waves to allow the UE 20 to communicate with the electronic device 1 using a first network or network protocol, and the radiating element 12 may be configured to receive, conduct, transmit, and/or radiate electromagnetic waves to allow the electronic device 1 to access the Internet by communicating with the BTS 21 using a second network or network protocol.

In some arrangements, the distance "D1" between the radiating element 11 and the UE 20 may be less than the distance "D2" between the radiating element 12 and the BTS 21. In other words, the distance D2 may be greater than the distance D1.

In some arrangements, the energy or power of the electromagnetic waves between the radiating element 11 and the UE 20 may be smaller than the energy or power of the electromagnetic waves between the radiating element 12 and the BTS 21. In other words, the energy or power of the electromagnetic waves between the radiating element 12 and the BTS 21 may be greater than the energy or power of the electromagnetic waves between the radiating element 11 and the UE 20. The radiating element 12 is configured to transmit and/or receive electromagnetic waves using a first energy or power, and the radiating element 11 is configured to transmit and/or receive electromagnetic waves using a second energy or power, where the first energy or power is greater than the second energy or power.

In some arrangements, the transmitting or radiation direction of the electromagnetic waves transmitted by the radiating element 11 to the UE 20 is more adjustable or flexible than the transmitting or radiation direction of the electromagnetic waves transmitted by the radiating element 12 to the BTS 21. For example, the radiating element 11 may be configured to adjust the radiation direction of the electromagnetic waves. For example, the radiating element 12 may be configured to radiate electromagnetic waves in a substantially fixed direction. For example, the arrangements of the slots shown in FIGS. 3 and 4 allow a more focused and fixed beam toward the BTS, while the configurations of elements 11 allow a wider beam.

For example, the radiation direction of the electromagnetic waves of the radiating element 11 may be more adjustable than that of the radiating element 12. For example, the radiation direction of the electromagnetic waves of the radiating element 11 is configured to be adjusted, and the radiation direction of the electromagnetic waves of the radiating element 12 is configured to be fixed. For example, the radiation directivity of the electromagnetic waves of the radiating element 12 may be higher than that of the radiating element 11. For example, the radiation patterns (such as the lobe 11*e* or beam) of the electromagnetic waves of the radiating element 11 may be more adjustable than the radiation patterns (such as the lobe 12*e*) of the electromagnetic waves of the radiating element 12. For example, the radiation pattern of the electromagnetic waves of the radiating element 11 is configured to be adjusted, and the radiation pattern of the electromagnetic waves of the radiating element 12 is configured to be fixed. For example, the amplitude and/or phase of the electromagnetic waves of the radiating element 11 may be more adjustable than that of the radiating element 12. For example, the coverage angle $\theta 1$ of the electromagnetic waves of the radiating element 11 may be greater than the coverage angle $\theta 2$ of the radiating element 12. For example, the coverage angle θ1 of the electromagnetic waves of the radiating element 11 is configured to be adjusted, and the coverage angle θ2 of the electromagnetic waves of the radiating element 12 is configured to be fixed. For example, the scan-angle coverage of the radiating element 11 may be wider than the scan-angle coverage of the radiating element 12. For example, the radiation direction and the scan-angle coverage of the electromagnetic waves of the radiating element 11 may be controlled by adjusting the amplitude and/or phase of the electromagnetic waves of the radiating element 11 through a beam-forming process.

Similarly, in some arrangements, in the reception direction (i.e., from the UE 20 to the radiating element 11 and from the BTS 21 to the radiating element 12), the reception direction of the electromagnetic waves received by the radiating element 11 from the UE 20 may be more adjustable than the reception direction of the electromagnetic waves received by the radiating element 12 from the BTS 21. The similar descriptions for the reception direction may be referred to the transmitting or radiation direction and are not repeated hereafter.

The antenna type and configuration (such as the length and the width) may determine what frequencies and/or bandwidths the radiating element 11 and the radiating element 12 can usefully operate with. The radiating element 11 and the radiating element 12 may be designed separately to be suitable to communicate with the UE 20 and the BTS 21. For example, the radiating element 11 may be designed such that the electromagnetic waves may be more adjustable to enhance the coverage angle so more than one UEs at indifferent places may communicate with the electronic device 1. The radiation direction and the scan-angle coverage of a patch antenna may be controlled by adjusting the amplitude and/or phase of electromagnetic waves through a beam-forming process. Therefore, in some arrangements, the radiating element 11 may be a patch antenna. For example, the radiating element 12 may be designed such that the electromagnetic waves may have higher power to extend the wireless channel and reduce the attenuation. A waveguide slot antenna has a better heat dissipation efficiency than a patch antenna. Therefore, in some arrangements, the radiating element 12 may be a waveguide slot antenna. In some arrangements, 2 or more waveguide slot antennas may be used to increase the radiation directivity and/or the power of the electromagnetic waves of the radiating element 12. For example, by controlling the amplitude and/or phase of electromagnetic waves fed into each of the waveguide slot antennas, the electromagnetic waves radiated by the radiating element 12 toward the BTS 21 may interfere (such as in a far field), and the radiation directivity and/or the power thereof may be increased.

By integrating the radiating element 11, the radiating element 12, and the electronic component **13*b* in the electronic device 1, the electronic device 1 (and the wireless transceiving system using the electronic device 1) may take up less space and require fewer or no cables. The radiating element 11 and the radiating element 12 can be suitably configured to communicate with the UE 20 and the BTS 21, where the electromagnetic waves can be converted by the electronic component 13*b***. No further processing unit is required. In addition, because all of the components are integrated in one package, the user may only need to deal with a single provider, such as a single internet service provider (ISP), and the wireless transceiving system is simpler and more convenient to set up in comparison with a system having discrete components.

Figure 3:
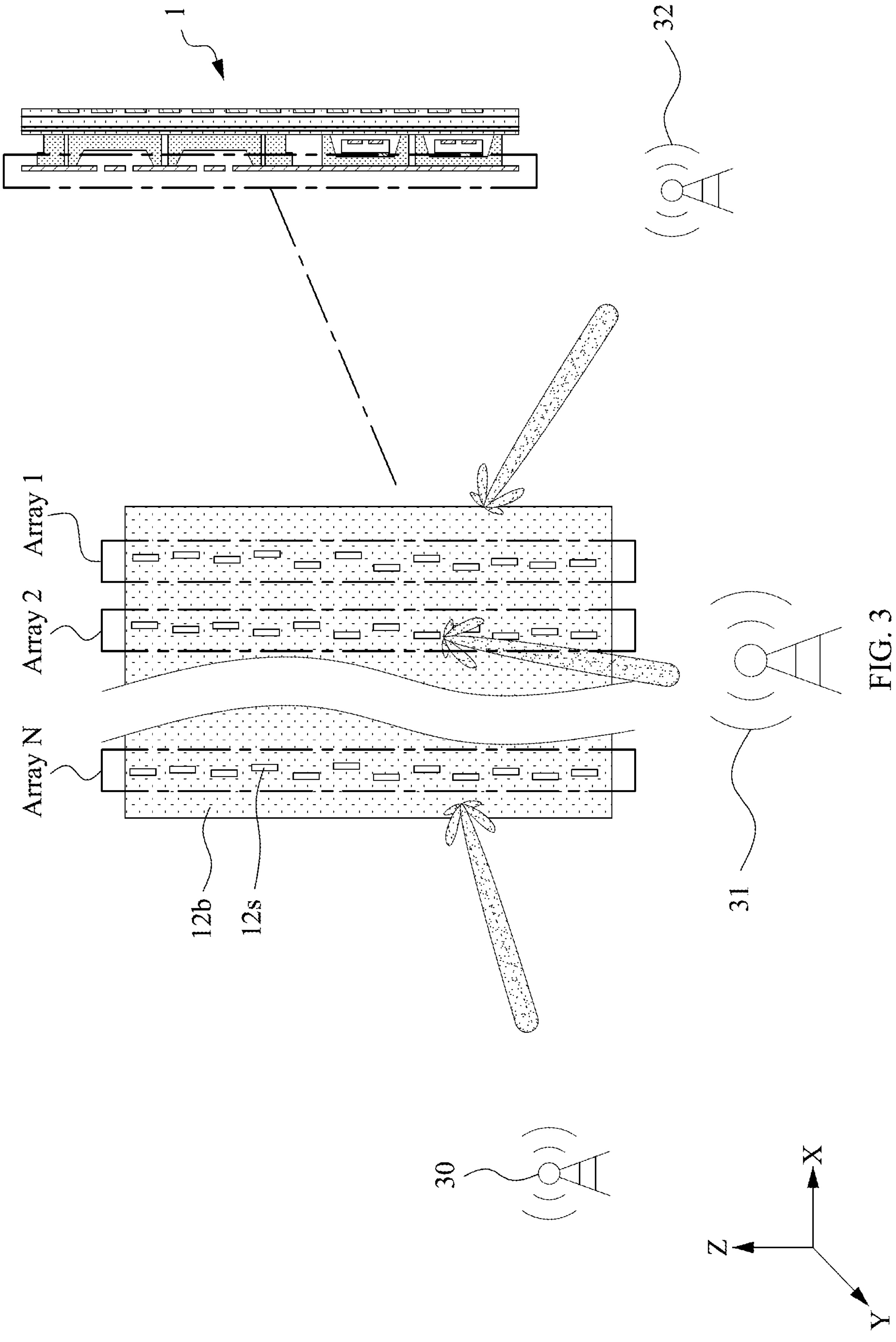
FIG. 3 illustrates a schematic diagram showing a part of a wireless transceiving system in accordance with some arrangements of the present disclosure.

FIG. 3 illustrates a schematic diagram showing a part of the wireless transceiving system shown in FIG. 2 in accordance with some arrangements of the present disclosure. The UE is not illustrated in FIG. 3 for the sake of conciseness.

The conductive layer **12*b* may have slots 12*s* arranged in N arrays, and N is a number greater than 2. Each of the slots 12*s* in the conductive layer 12*b* may have an elongated shape (e.g., a rectangular shape) with a longitudinal dimension or length (e.g., the vertical dimension along or parallel to the Z-axis) and a latitudinal dimension or length (e.g., the horizontal dimension along or parallel to the X-axis). As shown, the longitudinal dimension may be greater than the latitudinal dimension. In a given array, the slots 12*s* may be arranged along the longitudinal dimension (e.g., along or parallel to the Z-axis). The N arrays are spaced apart from each other along the latitudinal dimension (e.g., along or parallel to the X-axis). In some arrangements, the electromagnetic waves may radiate or passing through the slots 12*s*** within each of the N arrays along the longitudinal dimension (e.g., along or parallel to the Z-axis).

In some arrangements, the electromagnetic waves in the different arrays disposed along or parallel to the X-axis may be adjusted through, for example, a beam-forming processor to enhance the coverage angle and communicate with more than one BTSs (such as the BTS 30, the BTS 31, and the BTS 32) disposed along or parallel to the X-axis. For example, by controlling the amplitude and/or phase of electromagnetic waves fed into each of the arrays, the electromagnetic waves radiated by the slots **12*s*** toward one of the BTSs may interfere (such as in a far field), and the radiation directivity and/or the power toward one of the BTSs may be increased.

Figure 4:
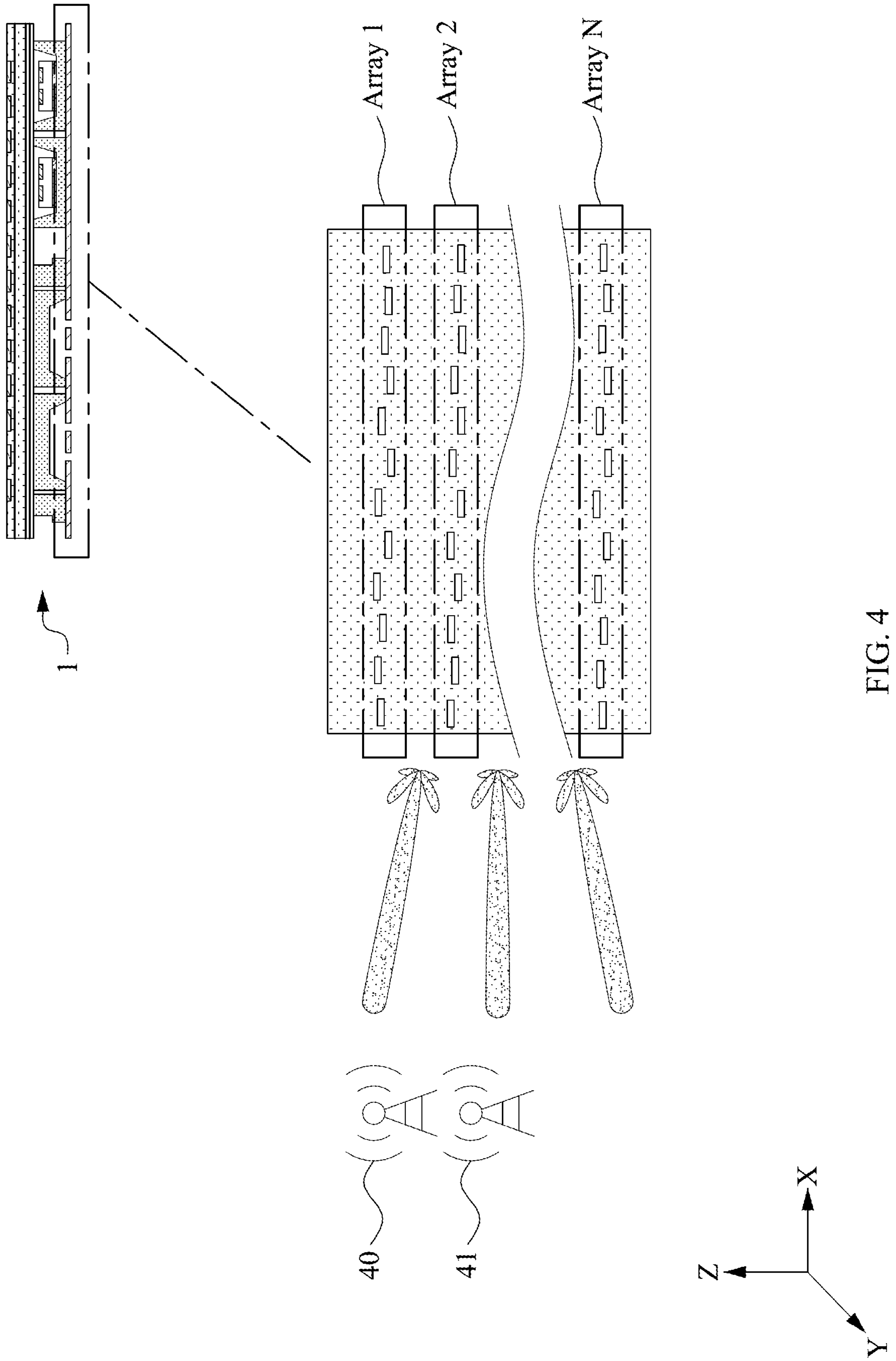
FIG. 4 illustrates a schematic diagram showing a part of a wireless transceiving system in accordance with some arrangements of the present disclosure.

FIG. 4 illustrates a schematic diagram showing a part of the wireless transceiving system shown in FIG. 2 in accordance with some arrangements of the present disclosure. The UE is not illustrated in FIG. 4 for the sake of conciseness. The schematic diagram of FIG. 4 is similar to the schematic diagram of FIG. 3, and the differences therebetween are described below.

The N arrays are spaced apart from each other along the latitudinal dimension (e.g., along or parallel to the Z-axis). In some arrangements, the electromagnetic waves may conduct through the slots **12*s*** within each of the N arrays along the longitudinal dimension (e.g., along or parallel to the X-axis).

In some arrangements, the electromagnetic waves in the different arrays disposed along or parallel to the Z-axis may be adjusted through, for example, a beam-forming processor to enhance the coverage angle and communicate with more than one BTSs (such as the BTS 40 and the BTS 41) disposed along or parallel to the Z-axis.

Figure 5:
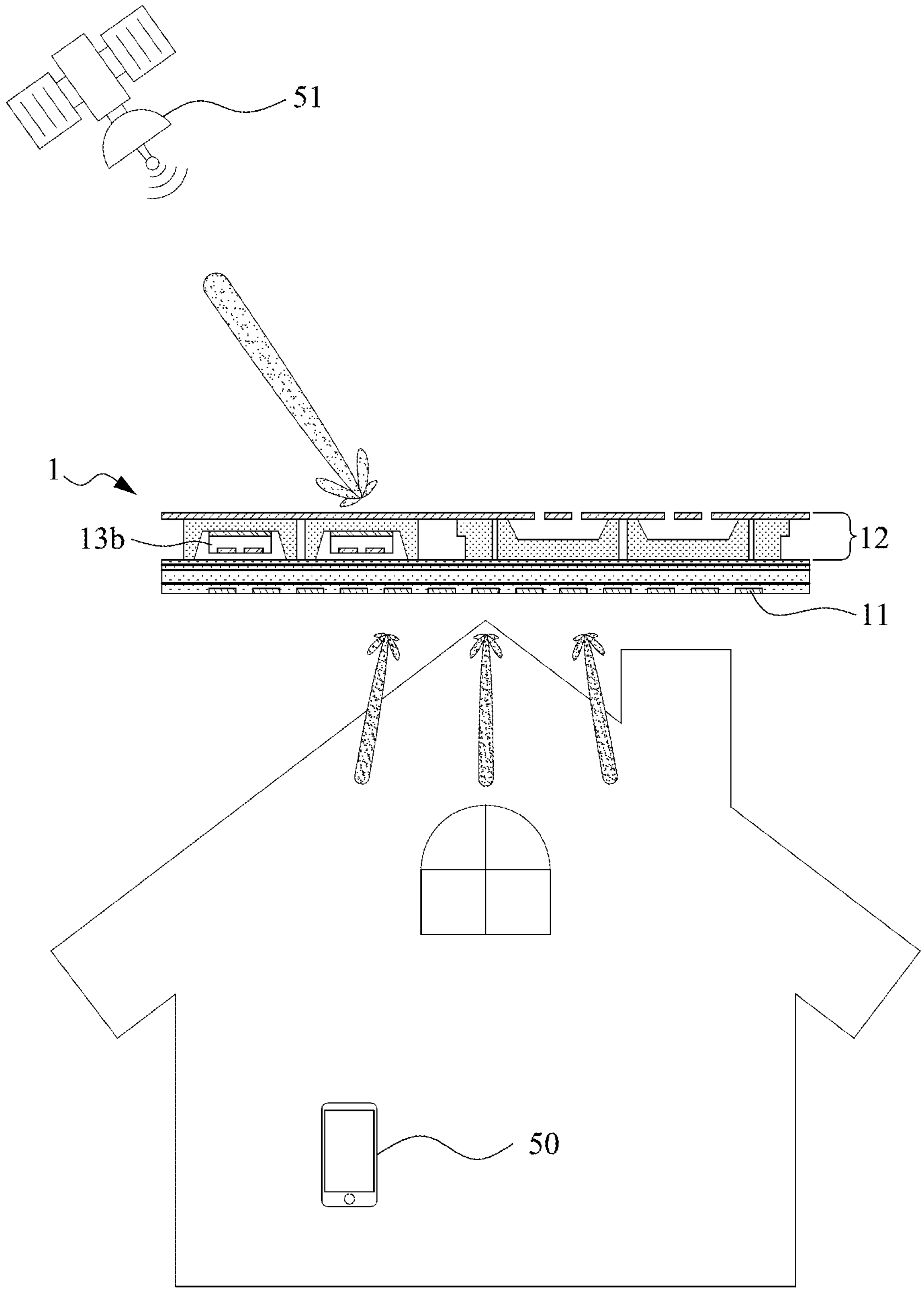
FIG. 5 illustrates a schematic diagram showing a wireless transceiving system in accordance with some arrangements of the present disclosure.

FIG. 5 illustrates a schematic diagram showing the wireless transceiving system shown in FIG. 2 in accordance with some arrangements of the present disclosure. The electronic device 1 in FIG. 1 may be used in the wireless transceiving system in FIG. 5. For example, the UE 50 may be in communication with the satellite 51 through the electronic device 1. The schematic diagram of FIG. 5 is similar to the schematic diagram of FIG. 2, except that the BTS is replaced by the satellite 51.

In some arrangements, the radiating element 11 may be configured to receive, conduct, transmit, and/or radiate electromagnetic waves to allow the UE 50 to communicate with the electronic device 1, and the radiating element 12 may be configured to receive, conduct, transmit, and/or radiate electromagnetic waves to allow the electronic device 1 to access the Internet by being communicated with satellite 51.

In some arrangements, the distance between the radiating element 11 and the UE 50 may be less than the distance between the radiating element 12 and the satellite 51.

In some arrangements, the energy or power of the electromagnetic waves between the radiating element 11 and the UE 50 may be smaller than the energy or power of the electromagnetic waves between the radiating element 12 and the satellite 51.

In some arrangements, the transmitting or radiation direction of the electromagnetic waves transmitted by the radiating element 11 to the UE 50 may be more adjustable than the transmitting or radiation direction of the electromagnetic waves transmitted by the radiating element 12 to the satellite 51 in the manner described herein. Similarly, in some arrangements, the reception direction of the electromagnetic waves received by the radiating element 11 from the UE 50 may be more adjustable than the reception direction of the electromagnetic waves received by the radiating element 12 from the satellite 51 in the manner described herein.

In some arrangements, the radiating element 11 and the radiating element 12 in the electronic device 1 in FIG. 5 may both include a patch antenna, or a chip antenna. Therefore, the electromagnetic waves transmitted and received by the radiating element 12 may be more adjustable.

FIG. 6 illustrates a cross-sectional view of an electronic device 6 in accordance with some arrangements of the present disclosure. The electronic device 6 of FIG. 6 is similar to the electronic device 1 of FIG. 1, and the differences therebetween are described below.

The electronic device 6 may further include a substrate 60 and an electrical contact 61. The substrate 60 may have a surface 601 facing the substrate 10 and a surface 602 opposite to the surface 601. The radiating element 12 may be disposed on or adjacent to the surface 602 of the substrate 60. The substrate 60 may be disposed between the radiating element 12 and the substrate 10.

The electrical contact 61 may be disposed between the substrate 60 and the substrate 10. The substrate 60 may be electrically connected with the substrate 10 through the electrical contact 61. The electrical contact 61 may include a solder ball, such as a controlled collapse chip connection (C4) bump, a ball grid array (BGA) or a land grid array (LGA).

The electronic component **13*b* may be disposed between the substrate 60 and the substrate 10. The electronic component 13*b* may be disposed within a space defined by the electrical contact 61, the substrate 60, and the substrate 10 to reduce the package size of the electronic device 6. The space between the substrate 10 and the substrate 60 is configured to accommodate the electronic component 13*b*. The electronic component 13*b* may be electronically connected with the substrate 10 and the substrate 60. The electronic component 13*b* may be electronically connected with the radiating element 11 and the radiating element 12**.

The electronic device 6 in FIG. 6 may be used in the wireless transceiving systems illustrated in FIG. 2, FIG. 3, FIG. 4, and FIG. 5. The similar descriptions may be referred to the electronic device 1 and are not repeated hereafter.

Spatially relative terms, such as “beneath,” “below,” “lower,” “above,” “upper,” “left,” “right” and the like, may be used herein for ease of description to describe one element or feature’s relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being “connected to” or “coupled to” another element, it may be directly connected to or coupled to the other element, or intervening elements may be present.

As used herein, the terms “approximately”, “substantially”, “substantial” and “about” are used to describe and account for small variations. When used in conduction with an event or circumstance, the terms can refer to instances in which the event or circumstance occurs precisely as well as instances in which the event or circumstance occurs to a close approximation. As used herein with respect to a given value or range, the term “about” generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term “substantially coplanar” can refer to two surfaces within micrometers (μm) of lying along the same plane, such as within 10 within 5 within 1 or within 0.5 μm of lying along the same plane. When referring to numerical values or characteristics as “substantially” the same, the term can refer to the values lying within ±10%, ±5%, ±1%, or ±0.5% of an average of the values.

The foregoing outlines features of several arrangements and detailed aspects of the present disclosure. The arrangements described in the present disclosure may be readily used as a basis for designing or modifying other processes and structures for carrying out the same or similar purposes and/or achieving the same or similar advantages of the arrangements introduced herein. Such equivalent constructions do not depart from the spirit and scope of the present disclosure, and various changes, substitutions, and alterations may be made without departing from the spirit and scope of the present disclosure.

What is claimed is:

1. An electronic device, comprising:

a first substrate having a plurality of antenna elements configured to radiate a first electromagnetic wave, the first substrate excluding an active component;

a second substrate having a first surface facing the first substrate and a second surface opposite to the first surface of the second substrate, wherein the first substrate is connected to the first surface of the second substrate through a soldering material, and wherein the soldering material, the first substrate, and the second substrate define an air cavity;

a radiating element configured to radiate a second electromagnetic wave different from the first electromagnetic wave, wherein the radiating element includes:

a waveguide disposed on the second surface of the second substrate; and a conductive layer disposed on the waveguide and having a plurality of slots partially exposing the waveguide; and an active device electrically connecting to the first substrate, wherein at least one of the slots of the conductive layer overlaps the active device in a first direction substantially perpendicular to the second surface of the second substrate.

2. The electronic device of claim 1, wherein a radiation pattern of the first electromagnetic wave is adjustable, and the plurality of antenna elements have a first scan-angle coverage, wherein a radiation pattern of the second electromagnetic wave is fixed, and the radiating element has a second scan-angle coverage, wherein the first scan-angle coverage is wider than the second scan-angle coverage, and wherein the active device includes an RF IC configured to convert the first electromagnetic wave to the second electromagnetic wave and vice versa.

3. The electronic device of claim 1, wherein the waveguide defines a cavity.

4. The electronic device of claim 3, wherein the cavity includes an air cavity, the plurality of slots expose the air cavity, and wherein the air cavity is configured to conduct the second electromagnetic wave, and the plurality of slots are configured to receive and/or radiate the second electromagnetic wave.

5. The electronic device of claim 4, wherein the waveguide is disposed between the conductive layer and the second substrate.

6. The electronic device of claim 5, wherein the plurality of slots are arranged in an array.

7. The electronic device of claim 1, wherein a thickness of the active device is less than a thickness of the soldering material measured in the first direction.

8. The electronic device of claim 7, wherein a thickness of the radiating element is greater than a thickness of the first substrate, and the thickness of the radiating element is greater than a distance between the first substrate and the second substrate measured in the first direction.

9. The electronic device of claim 1, wherein the plurality of antenna elements are separated from the radiating element by the first substrate and the second substrate.

10. The electronic device of claim 2, the radiating element is configured to radiate the second electromagnetic wave in a substantially fixed direction.

11. The electronic device of claim 2, wherein the first scan-angle coverage and the second scan-angle coverage are not overlapped.

12. The electronic device of claim 2, wherein the plurality of antenna elements are configured to radiate the first electromagnetic wave to a first device having a first mobility, and the radiating element is configured to radiate the second electromagnetic wave to a second device having a second mobility, and wherein the first mobility is different from the second mobility.

13. The electronic device of claim 1, further comprising:

a conductive structure non-overlapping with the radiating element in the first direction, wherein the conductive structure defines a space.

14. The electronic device of claim 13, wherein the conductive structure includes a lead frame.

15. The electronic device of claim 13, wherein the space defined by the conductive structure is covered by the first substrate and the conductive layer is disposed under the conductive structure.

16. The electronic device of claim 3, wherein an active surface of the active device faces the cavity of the waveguide, and the active device overlaps at least one of the plurality of antenna elements and the cavity of the waveguide in the first direction.

17. The electronic device of claim 16, wherein a backside surface of the active device is in contact with a lower surface of the first substrate, and the active surface of the active device is connected with the second substrate through a solder ball.

18. The electronic device of claim 17, wherein the soldering material is non-overlapped with the cavity of the waveguide and the slots of the conductive layer in the first direction, and wherein the soldering material is overlapped with the active device and the solder ball in a second direction substantially parallel with the second surface of the second substrate.

19. The electronic device of claim 1, wherein the first substrate includes a device mounting region non-overlapping with the radiating element in the first direction, and wherein the device mounting region comprises:

a conductive structure defining a space; and an electronic component disposed within the space and electrically connected to the first substrate.

20. The electronic device of claim 19, wherein the conductive structure includes a lead frame, the space defined by the conductive structure is covered by the first substrate, and the conductive layer is disposed under the conductive structure.

* * * * *